(12) United States Patent
Kim et al.

(10) Patent No.: US 8,673,516 B2
(45) Date of Patent: Mar. 18, 2014

(54) SURFACE PRESSURE CONTROLLING DEVICE FOR FUEL CELL STACK

(75) Inventors: Sae Hoon Kim, Gyeonggi-do (KR); Duck Whan Kim, Seoul (KR); Jung Do Suh, Seoul (KR); Haeng Jin Ko, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 774 days.

(21) Appl. No.: 12/823,315

(22) Filed: Jun. 25, 2010

(65) Prior Publication Data
US 2011/0123882 A1   May 26, 2011

(30) Foreign Application Priority Data
Nov. 25, 2009  (KR) .................. 10-2009-0114423

(51) Int. Cl.
*H01M 2/14* (2006.01)
(52) U.S. Cl.
USPC ............................ 429/469; 429/470; 429/508
(58) Field of Classification Search
USPC .................................................. 429/400–535
See application file for complete search history.

(56) References Cited

U.S. PATENT DOCUMENTS

| | | | |
|---|---|---|---|
| 7,291,413 B2* | 11/2007 | Allen et al. | 429/470 |
| 2006/0246331 A1 | 11/2006 | Steinbroner | |
| 2008/0044714 A1* | 2/2008 | Fritz et al. | 429/37 |
| 2008/0166598 A1* | 7/2008 | Mahlanen | 429/12 |

FOREIGN PATENT DOCUMENTS

| | | |
|---|---|---|
| JP | 59-215676 A | 12/1984 |
| JP | 2002-117889 A | 4/2002 |
| JP | 2006-139985 A | 6/2006 |
| JP | 2006-147501 A | 6/2006 |
| JP | 2008-135331 A | 6/2008 |

* cited by examiner

*Primary Examiner* — Kenneth Douyette
*Assistant Examiner* — James Lee
(74) *Attorney, Agent, or Firm* — Edwards Wildman Palmer LLP; Peter F. Corless

(57) ABSTRACT

The present invention provides a surface pressure controlling device for a fuel cell stack, in which an inflator capable of being expanded by pneumatic or hydraulic pressure is mounted in an end plate so as to control the surface pressure required for the assembly of the fuel cell stack to be maintained above a predetermined level.

7 Claims, 8 Drawing Sheets

SURFACE PRESSURE CONTROLLING DEVICE FOR FUEL CELL STACK

CROSS-REFERENCE TO RELATED APPLICATION

This application claims under 35 U.S.C.§119(a) the benefit of Korean Patent Application No. 10-2009-0114423 filed Nov. 25, 2009, the entire contents of which are incorporated herein by reference.

BACKGROUND (a) Technical Field

The present disclosure relates, generally, to a surface pressure controlling device for a fuel cell stack. More particularly, it relates to a surface pressure controlling device for a fuel cell stack, in which an inflator capable of being expanded by pneumatic or hydraulic pressure is suitably mounted in an end plate so as to control the surface pressure required for the assembly of the fuel cell stack to be maintained above a predetermined level.

(b) Background Art

Typically, a fuel cell stack comprises a plurality of unit cells, in which a membrane electrode assembly including an electrolyte membrane and anode and cathode electrodes, a gas diffusion layer (GDL), a gasket, a separator including a flow field, and end plates for supporting and fixing them are sequentially stacked, the plurality of unit cells being coupled together while maintaining a predetermined surface pressure. For example, about 100 to 300 unit cells are suitably arranged between the end plates.

Since the surface pressure in the fuel cell stack is directly related to the ohmic loss due to the increase in contact resistance and the mass transfer resistance in the gas diffusion layer, it is necessary to maintain the clamping force of the stack at an appropriate level to achieve good stack performance.

Conventionally, the fuel cell stack is assembled using bolts and nuts or bands. For example, as shown in FIG. 8, a bolt 100 having a length greater than that of the stack is used and nuts 102 are tightened to both ends of the bolt 100 and, as shown in FIG. 9, a band 104 is fastened to the end plates being pressed by a press and then fixed by bolts.

However, in the method of assembling the fuel cell stack using bolts there is a large amount of dead volume, such as the space between the fuel cell stack and the long bolts, the nut portions extending to the outside of the end plates, etc., which is inappropriate for application to the vehicle.

Further, in the method of assembling the fuel cell stack using bands, in the event of a deviation in elastic properties or dimensions of each component of the fuel cell stack, the length of the assembled fuel cell stack increases, and thus it is necessary to prepare bands having various dimensions, which cannot appropriately cope with the fuel cell stacks having a large deviation in length. When the fuel cell stack is excessively fastened, the performance of the fuel cell stack is suitably reduced by the deformation of the gas diffusion layer, and accordingly this method cannot handle the change in the clamping force of the stack.

Alternatively, as shown in FIG. 10, a disc spring 106 is used as a surface pressure maintaining means between the end plate and the separator or, as shown in FIG. 11, a spring module 108 including a plurality of springs is used. However, in these methods, a separate pressure plate is provided, which increases the weight and volume, and the pressure plate is integrated with a current collector, which complicates an electricity leading structure through the current collector.

Accordingly, when such high stiffness metal elastic members such as a plate spring, a disc spring, a coil spring, etc. are used to provide a uniform surface pressure on the fuel cell stack, it is necessary to use an end plate including a high strength member or a reinforcing structure which can suitably endure a high local load of the metal elastic member. Accordingly, the weight and volume of the fuel cell stack increases, which makes it difficult to suitably optimize the layout of the fuel cell stack in an engine room. Further, since it is necessary to disassemble and assemble the metal elastic member such as a spring module in a state where the metal elastic member is clamped at a clamping pressure of 3 to 4 tons, it requires pressing equipment, which may be disadvantageous in terms of assembly and maintenance.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In one aspect, the present invention provides a surface pressure controlling device for a fuel cell stack, in which an inflator capable of being expanded is suitably mounted in an end plate having a sandwich structure and a clamping band is used to clamp the fuel cell stack such that the inflator is suitably expanded at a predetermined pressure by hydraulic or pneumatic pressure supplied from a hydraulic or pneumatic pressure source to allow the end plate receiving the expansion pressure of the inflator to clamp the fuel cell stack at a constant surface pressure. In preferred embodiments, the present invention provides a surface pressure controlling device for a fuel cell stack, which can automatically correct the clamping pressure against an increase in deviation in the thickness direction of an end plate.

In another preferred embodiment, the present invention provides a surface pressure controlling device for a fuel cell stack in which a plurality of unit cells are suitably stacked, the device preferably including a lower end plate closely adhered and fixed to one end the fuel cell stack; an upper end plate closely adhered to another end of the fuel cell stack and suitably expanded by hydrostatic pressure; and a clamping band for winding the fuel cell stack and the upper and lower end plates to be clamped at a predetermined clamping pressure, wherein the surface pressure of the fuel cell stack is suitably controlled by applying hydraulic or pneumatic pressure to the upper end plate to be expanded.

In a preferred embodiment, the upper end plate may include an upper housing having an opened bottom and including a female projection having a guide groove and integrally formed on a lower surface thereof; a lower housing having an opened top and including a male projection inserted into the guide groove of the female projection and integrally formed on a lower surface thereof; and an inflator suitably disposed on a bottom surface of the lower housing and suitably expanded by hydraulic or pneumatic pressure, wherein the upper housing is moved in the stacking direction by the expansion of the inflator.

In another preferred embodiment, a hydrostatic pressure flow pipe extending from the inflator may suitably penetrate the upper housing and be connected to a hydraulic or pneumatic pressure supply means.

In still another preferred embodiment, the upper end plate may include an upper housing having an opened bottom and including a female projection having a guide groove and integrally formed on a lower surface thereof; a lower housing having an opened top and including a male projection inserted into the guide groove of the female projection and integrally formed on a lower surface thereof; and a sealing for air tightness inserted into a groove formed along an outer circumference of the lower housing and brought into suitably close contact with an inner circumference of the upper housing, wherein the upper housing is suitably expanded to the outside by applying hydraulic or pneumatic pressure to an airtight space between the upper and lower housings.

In yet another preferred embodiment, a hydrostatic pressure flow pipe may be suitably formed on an upper surface of the upper housing and connected to a hydraulic or pneumatic pressure supply means.

In still yet another preferred embodiment, a clip for suitably maintaining displacement may be formed on an outer surface of the upper housing and a plurality of latch grooves, into which the clip is inserted, may be formed on a clamping band.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
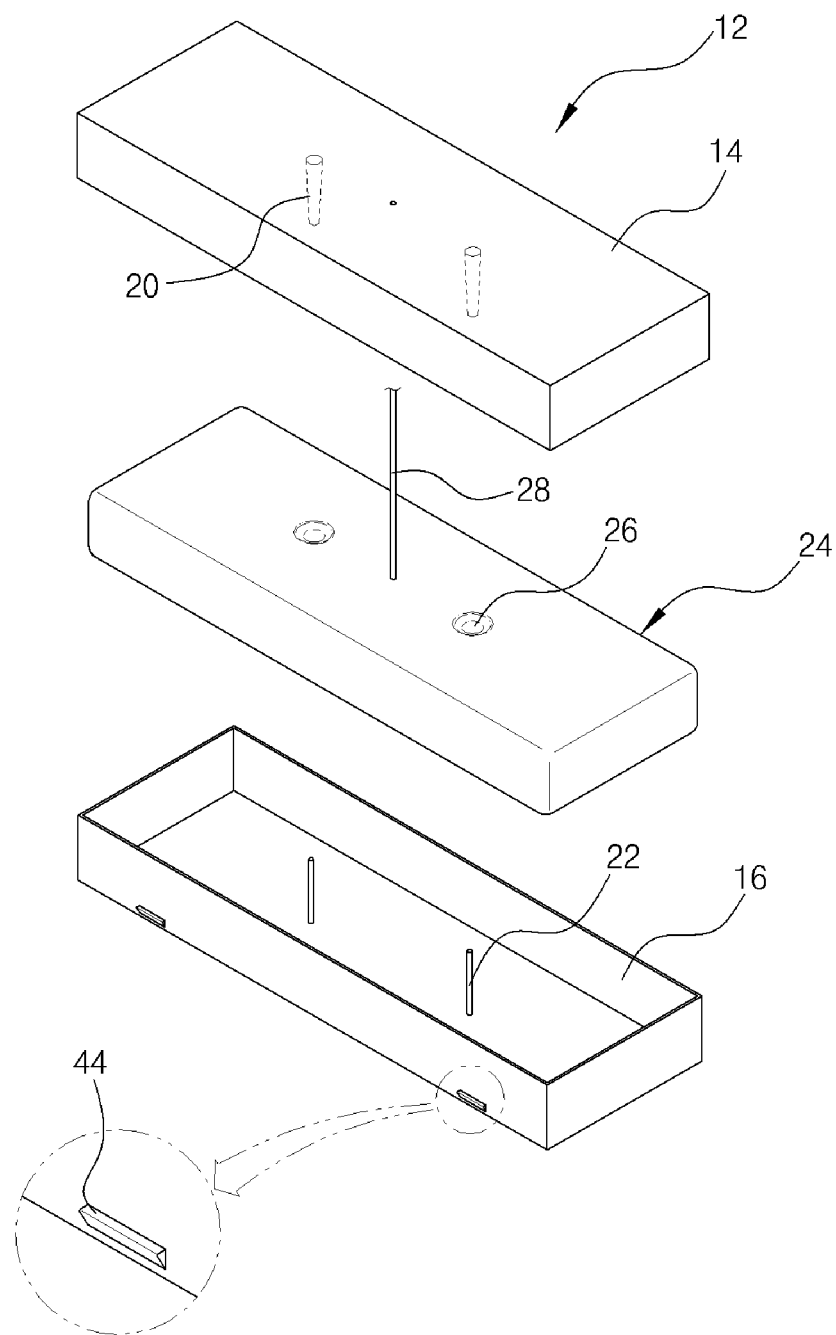
FIG. 1 is an exploded perspective view of an upper end plate of a surface pressure controlling device for a fuel cell stack in accordance with an exemplary embodiment of the present invention.

Reference numerals set forth in the Drawings includes reference to the following elements as further discussed below:

| | |
|---|---|
| 10: (fuel cell) stack | 12: upper end plate |
| 14: upper housing | 16: lower housing |
| 17: lower end plate | 18: guide groove |
| 20: female projection | 22: male projection |
| 24: inflator | 26: interference preventing hole |
| 28: hydrostatic pressure flow pipe | |
| 30: hydraulic or pneumatic pressure supply means | |
| 32: brake pedal | 34: master cylinder |
| 36: piston | 38: on/off valve |
| 40: clamping band | 42: latch groove |
| 44: clip for maintaining displacement | |
| 46: sealing for air tightness | 48: hydrostatic pressure supply pipe |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention features a surface pressure controlling device for a fuel cell stack comprising a lower end plate, an upper end plate, and a clamping band, wherein the surface pressure of the fuel cell stack is controlled by applying hydraulic or pneumatic pressure to the upper end plate to be expanded.

In one embodiment, the lower end plate is closely adhered and fixed to one end the fuel cell stack.

In another embodiment, the upper end plate is closely adhered to another end of the fuel cell stack, and is expanded by hydrostatic pressure.

In another further embodiment, the clamping band is used for winding the fuel cell stack and the upper and lower end plates at a predetermined clamping pressure.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2:
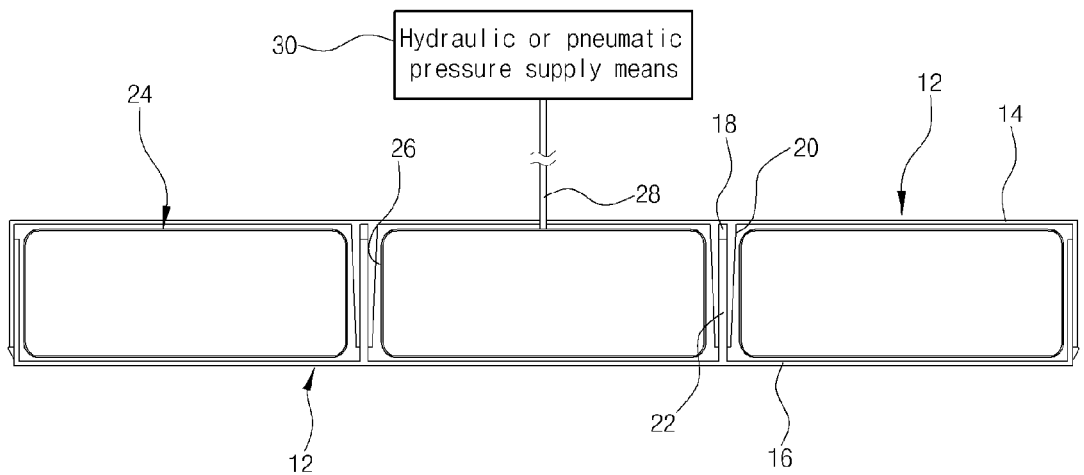
FIG. 2 is an assembled cross-sectional view of an upper end plate of a surface pressure controlling device for a fuel cell stack in accordance with an exemplary embodiment of the present invention.
Figure 3:
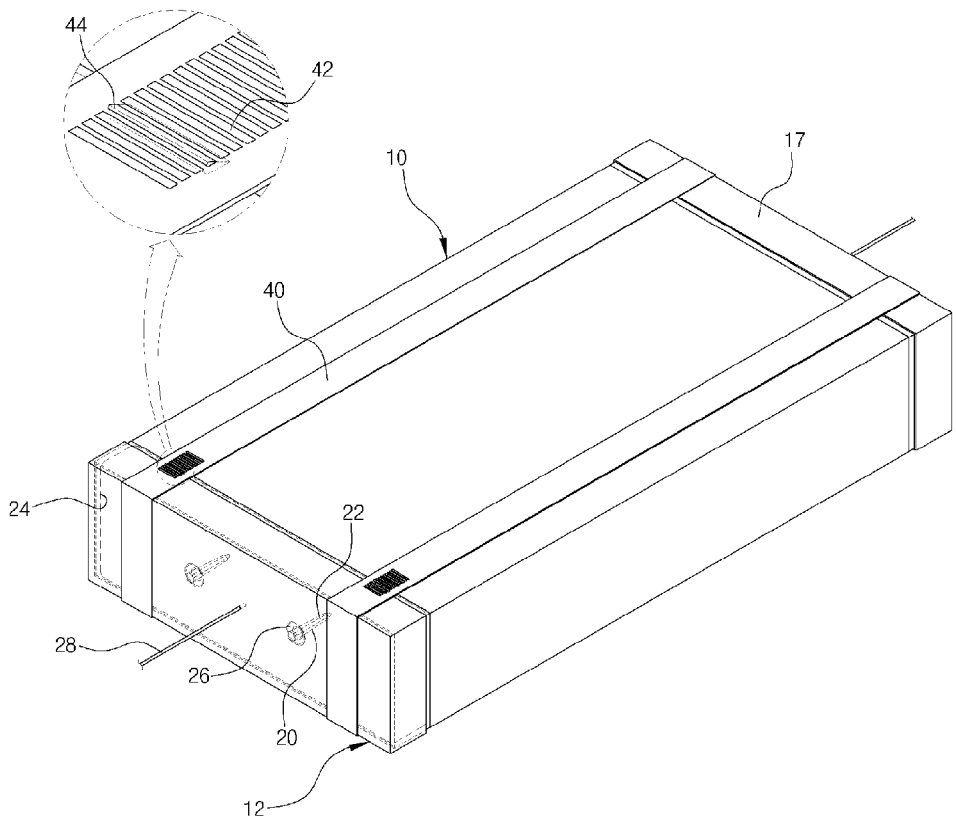
FIG. 3 is a perspective view illustrating a stack assembly structure using the upper end plate shown in FIGS. 1 and 2.
Figure 4:
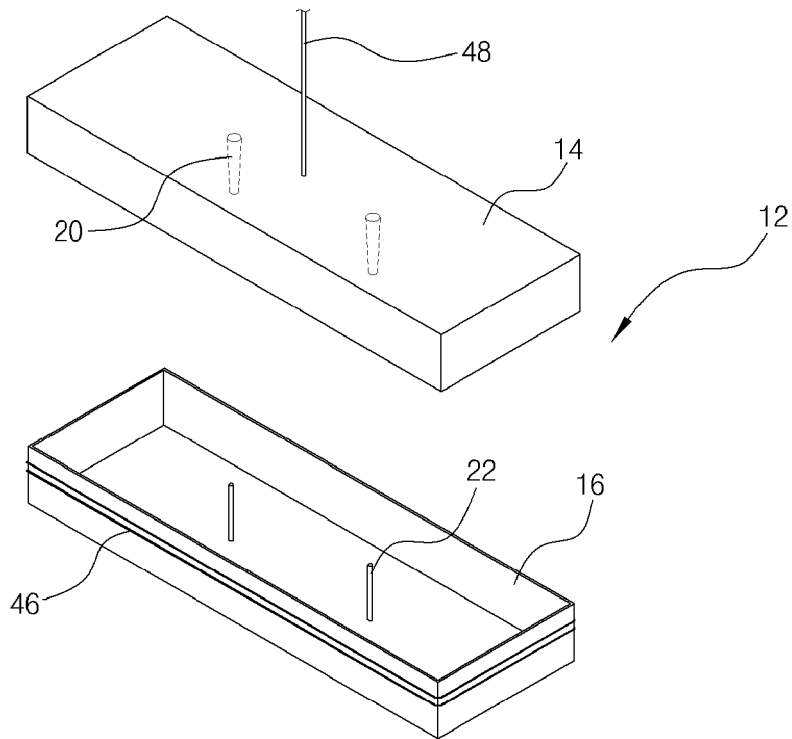
FIG. 4 is an exploded perspective view of an upper end plate of a surface pressure controlling device for a fuel cell stack in accordance with another exemplary embodiment of the present invention.
Figure 5:
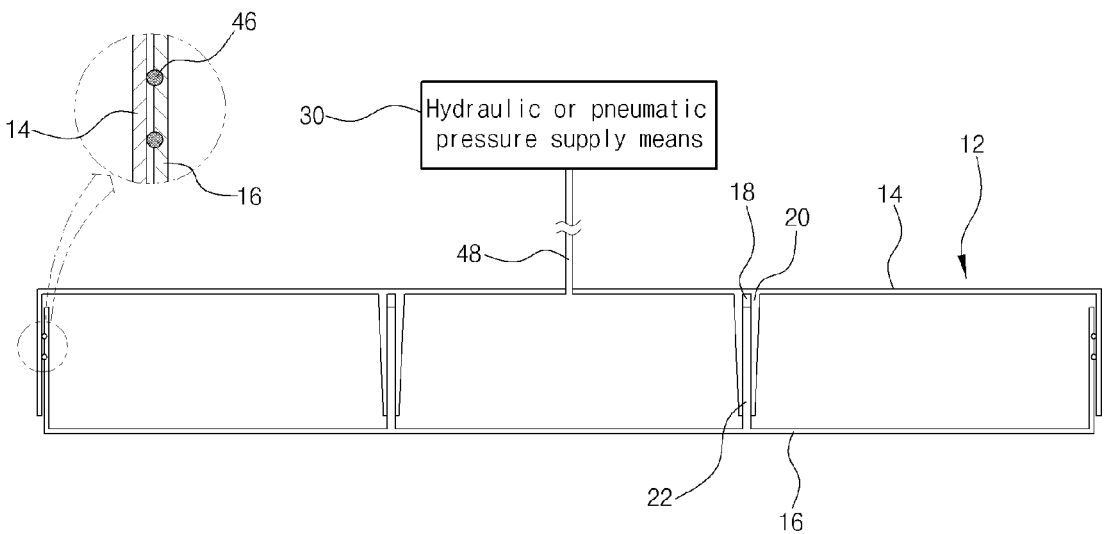
FIG. 5 is an assembled cross-sectional view of an upper end plate of a surface pressure controlling device for a fuel cell stack in accordance with another exemplary embodiment of the present invention.
Figure 6:
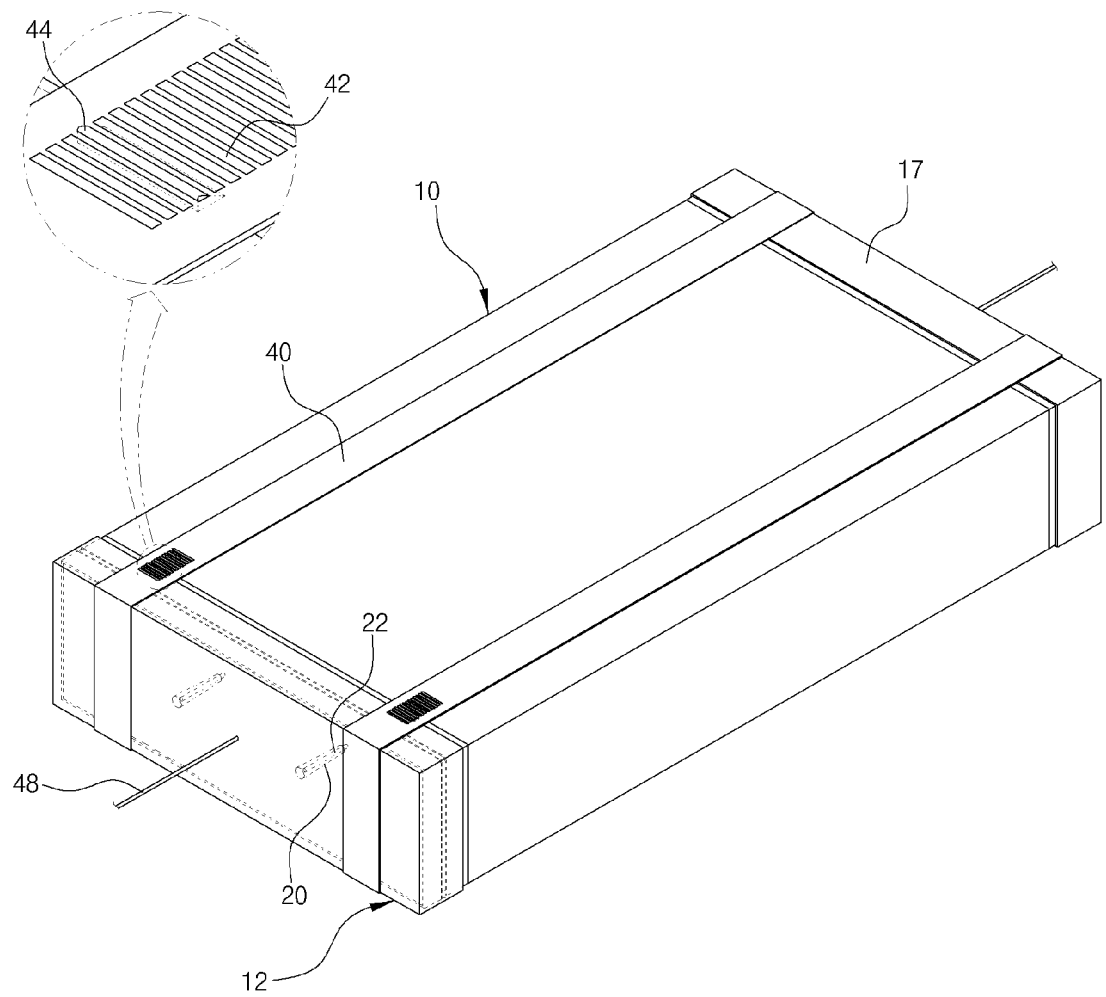
FIG. 6 is a perspective view illustrating a stack assembly structure using the upper end plate shown in FIGS. 4 and 5.

FIG. 1 is an exploded perspective view of an upper end plate of a surface pressure controlling device for a fuel cell stack in accordance with an exemplary embodiment of the present invention. In further related embodiments and as shown in FIG. 2 or FIG. 3, for example, FIG. 2 is an assembled cross-sectional view thereof, and FIG. 3 is a perspective view illustrating a stack assembly structure using the upper end plate shown in FIGS. 1 and 2.

According to certain preferred embodiments, a fuel cell stack is manufactured by stacking a membrane electrode assembly, a gas diffusion layer, a gasket, and a separator including a flow field and connecting end plates for supporting and fixing them to both ends of the fuel cell stack. In preferred embodiments of the present invention, the end plates connected to both ends of the fuel cell stack are referred to as upper and lower end plates, respectively.

According to preferred embodiments described herein, the present invention aims at providing a structure in which an upper end plate having a sandwich structure and divided into two housings generates a suitable displacement in the thickness direction during assembly of the fuel cell stack, a clamping band is used to suitably clamp the fuel cell stack at a constant surface pressure in a position where the displacement is completed, and an inflator mounted in the end plate is suitably expanded using hydrostatic pressure energy.

Accordingly, for this purpose, an upper end plate 12 has a sandwich structure, in which upper and lower housings 14 and 16 are suitably connected to each other to form an airtight space, and a lower end plate 17 has a fixed structure.

Preferably, the upper end plate 12 in accordance with an exemplary embodiment of the present invention includes the upper and lower housings 14 and 16. In further related embodiments, the upper housing 14 has an opened bottom and includes a pair of female projections 20 each having a guide groove 18 and integrally formed on the lower surface thereof. Preferably, the lower housing 16 has an opened top and includes a pair of male projections 22 inserted into the guide grooves 18 of the female projections 20, respectively, and integrally formed on the lower surface thereof.

In other further embodiments, the upper and lower housings 14 and 16 are suitably connected to each other in such a manner that the four sides of the upper housing 14 are placed in the four sides of the lower housing 16. Further, during the connection, the male projections 22 of the lower housing 16 are suitably inserted into the guide grooves 18 formed in the female projections 20 of the upper housing 14 to accurately guide the connection between the upper and lower housings 14 and 16.

According to further preferred embodiments, an inflator 24, which is suitably expanded by hydraulic or pneumatic pressure, is mounted on the bottom surface of the lower housing 16, i.e., in the airtight space between the upper and lower housings 14 and 16. Preferably, interference preventing holes 26, in which the male projections 22 and the female projections 20 are connected to each other, are formed at predetermined positions of the inflator 24.

Figure 7:
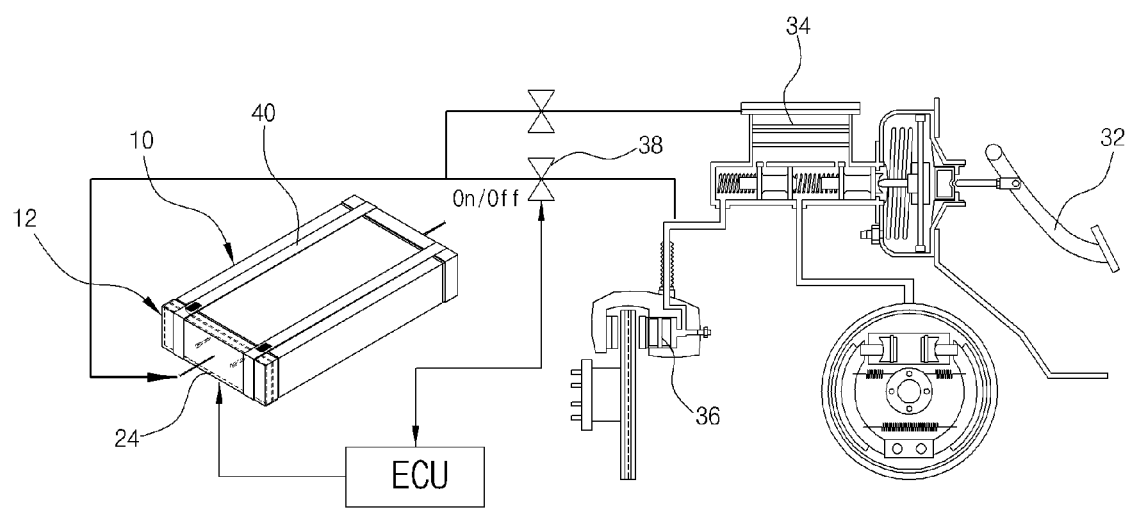
FIG. 7 is a schematic diagram showing a means for applying hydrostatic pressure to the upper end plate in accordance with the present invention to be expanded.
Figure 8:
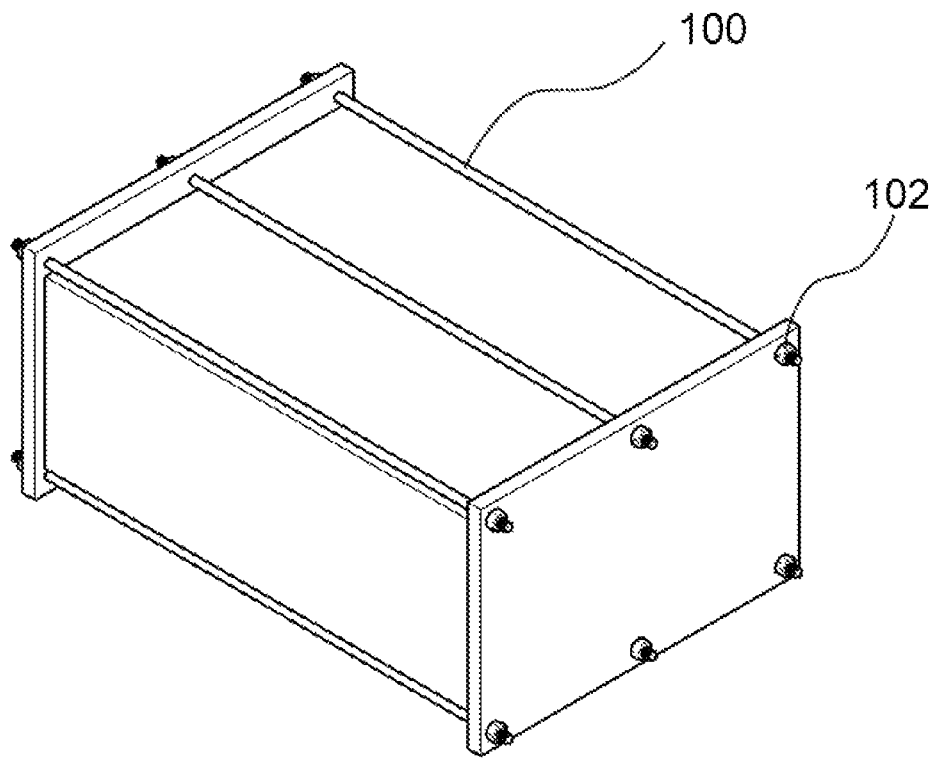
FIGS. 8 to 11 are schematic diagram showing fuel cell assembly apparatuses in accordance with the prior art.
Figure 9:
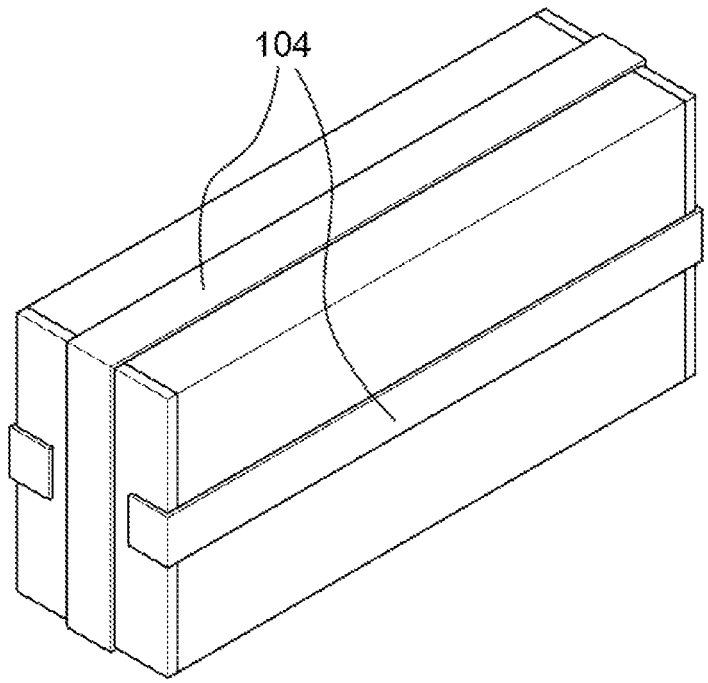
Figure 10:
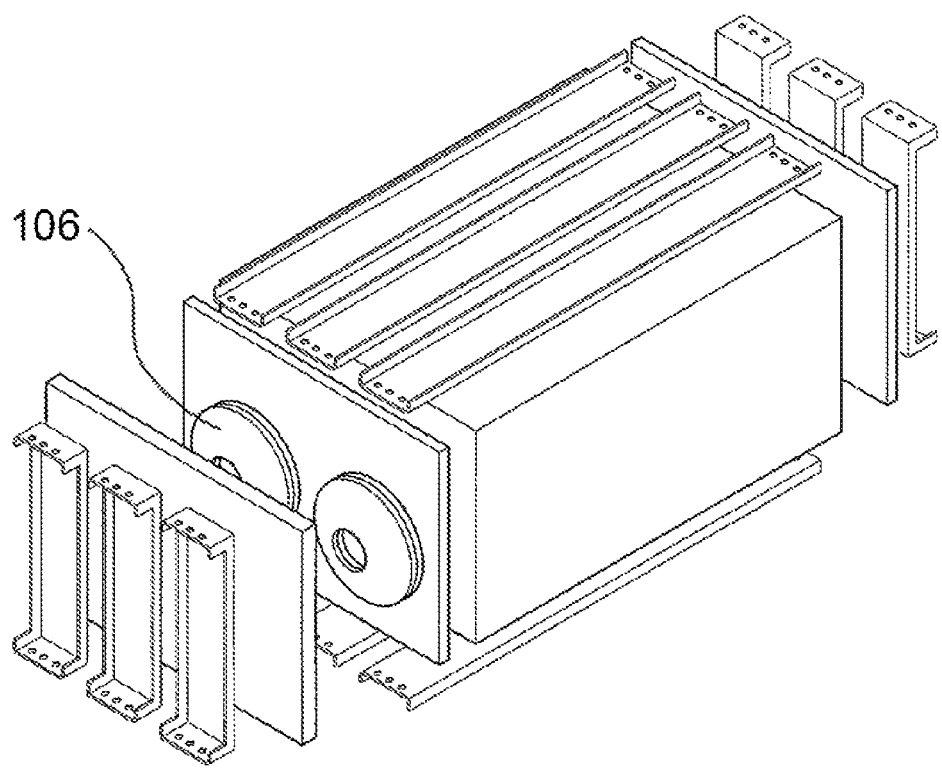
Figure 11:
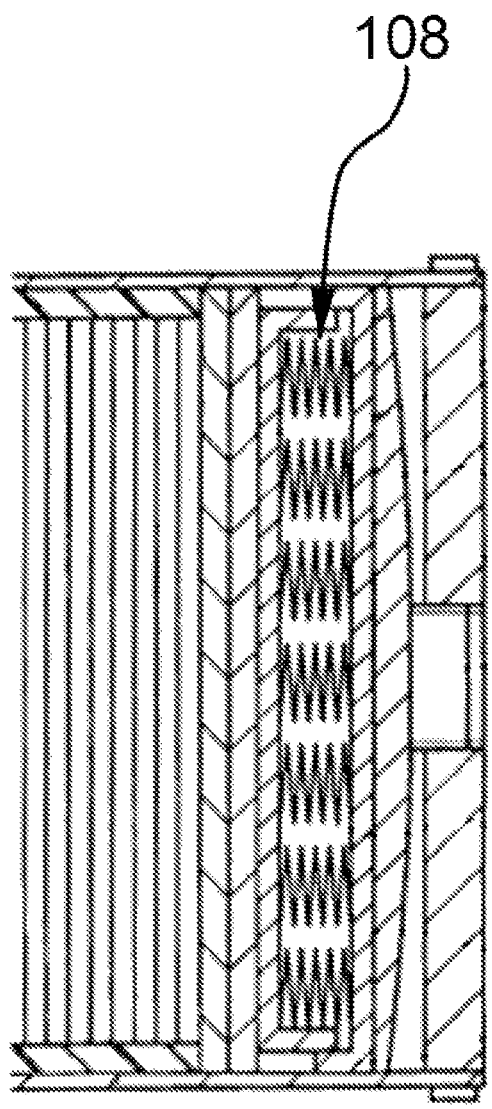

In further preferred embodiments, a hydrostatic pressure flow pipe 28 extending from the inflator 24 penetrates the upper housing 14 and is suitably connected to a hydraulic or pneumatic pressure supply means 30. For example, as shown in FIG. 7, the hydraulic or pneumatic pressure supply means 30 may preferably comprise an energy generating means in the vehicle such as a hydraulic brake system including a master cylinder 34 for generating hydraulic pressure by the operation of a brake pedal 32 and a piston 36 for suitably receiving the hydraulic pressure of the master cylinder 34 to clamp a disc, or may suitably receive hydraulic or pneumatic pressure from a power steering system for generating hydraulic or pneumatic pressure in the vehicle.

Preferably, a hydraulic line for connecting the master cylinder 34 of the hydraulic brake system and the piston 36 that clamps the disc may be suitably branched and connected to the hydrostatic pressure flow pipe 28 of the inflator 24 and an on/off valve 38 controlled by an ECU is installed in the branch line such that the hydraulic pressure generated by the master cylinder 34 is applied to the inflator 24 to be expanded.

In other certain embodiments, the fuel cell stack 10 and the upper and lower end plates 12 and 17 closely adhered to both ends of the stack 10 are suitably clamped by a plurality of clamping bands 40 to assemble the fuel cell stack 10 with the upper and lower end plates 12 and 17.

Preferably, a plurality of latch grooves 42 are suitably formed at predetermined positions of the clamping band 40 in the longitudinal direction, and a clip 44 for maintaining displacement, which is suitably inserted into one of the plurality of latch grooves 42, is integrally formed at a predetermined position of the outer surface of the upper housing 14 of the upper end plate 12.

Preferably, the latch grooves 42 may be formed on the inner surface of a stack enclosure (not shown), which is suitably configured to protect the fuel cell stack 10, instead of the clamping band 40, or formed on a peripheral of the stack enclosure to suitably ensure the connection of the clip 44 for maintaining displacement.

Accordingly, when the brake pedal 32 is depressed, the hydraulic pressure generated by the master cylinder 34 of the hydraulic brake system is suitably applied to the inflator 24 through the hydrostatic pressure flow pipe 28 such that the inflator 24 is expanded to move the upper housing 14 to the outside and, at the same time, the clamping bands 40 are suitably tightened to firmly clamp the fuel cell stack 10 at a predetermined clamping pressure.

Accordingly, the inflator 24 is supported by the entire area of the lower housing 16 and expanded to push the upper housing 14 while applying a uniform clamping pressure to the entire area of the upper housing 14, thereby providing a uniform surface pressure to both ends of the fuel cell stack 10.

In other further embodiments, when the upper end plate 12 is suitably expanded and displaced in the thickness direction by an increase in the amount of expansion of the inflator 24, that is, when the upper housing 14 is further moved to the outside, the clip 44 for maintaining displacement formed on the upper housing 14 is suitably moved and inserted into another of the plurality of latch grooves 42 formed on the clamping band 40, and thereby the assembly state of the fuel cell stack 10 is firmly maintained by the clamping bands 40 even in a state where the upper end plate 12 is displaced.

According to another exemplary embodiment of the present invention, the inflator adopted in the exemplary embodiment is suitably eliminated, and instead, the upper end plate 12 has an expandable structure.

Preferably, the upper end plate 12 in accordance with another exemplary embodiment of the present invention comprises an upper housing 14 having an opened bottom and including a pair of female projections 20 each having a guide groove 18 and integrally formed on the lower surface thereof and a lower housing 16 having an opened top and including a pair of male projections 22 inserted into the guide grooves 18 of the female projections 20, respectively, and integrally formed on the lower surface thereof. In certain preferred embodiments, a sealing for air tightness 46, which is to be in contact with the inner circumference of the upper housing 14, is inserted into a groove formed along the outer circumference of the lower housing 16 to provide an airtight space between the upper housing 14 and the lower housing 16.

Preferably, a hydrostatic pressure supply pipe 48 connected to a hydraulic or pneumatic pressure supply means 30 and supplying hydraulic or pneumatic pressure to the airtight space is integrally formed on the upper surface of the upper housing 14.

Accordingly, when the hydraulic pressure is suitably supplied from the hydraulic pressure supply means 30 such as the hydraulic brake system to the airtight space between the upper housing 14 and the lower housing 16 through the hydrostatic pressure supply pipe 48, the upper housing 14 is pushed to the outside by the hydraulic pressure and, at the same time, the clamping bands 40 are suitably tightened to firmly clamp the fuel cell stack 10 at a predetermined clamping pressure.

In further preferred embodiments, even when the amount of outward displacement of the upper housing 14 is suitably increased, the clip 44 for maintaining displacement formed on the upper housing 14 is moved and inserted into another of the plurality of latch grooves 42 formed on the clamping band 40, and thereby the assembly state of the fuel cell stack 10 is firmly maintained by the clamping bands 40 even in a state where the upper end plate 12 in accordance with another exemplary embodiment of the present invention is displaced.

As described above, the present invention provides, but is not limited only to, the following effects.

According to preferred embodiments of the present invention, the inflator capable of being expanded is suitably mounted in the end plate having a sandwich structure and the clamping band is used to clamp the fuel cell stack including the end plates such that the inflator is suitably expanded at a predetermined pressure by hydraulic or pneumatic pressure supplied from a hydraulic or pneumatic pressure source, and thereby it is possible for the end plate receiving the expansion pressure of the inflator to clamp the fuel cell stack at a constant surface pressure.

Further, when the end plate is suitably expanded and displaced in the thickness direction, the clip for maintaining displacement formed on the end plate is inserted and fixed to one of the plurality of latch groove formed on the clamping band, and thereby the assembly state of the fuel cell stack is firmly maintained by the clamping band even in a state where the end plate is suitably displaced.

Accordingly, it is possible to automatically correct the clamping pressure by the connection of the clip and the latch groove against the increase in deviation in the thickness direction of the end plate.

Further, as the hydraulic or pneumatic pressure supply means which expands the inflator, the energy generating means in the vehicle such as a hydraulic brake system is used to suitably improve the energy utilization in the vehicle.

The present invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A surface pressure controlling device for a fuel cell stack in which a plurality of unit cells are stacked, the device comprising:
    a lower end plate closely adhered and fixed to one end the fuel cell stack;
    an upper end plate closely adhered to another end of the fuel cell stack and expanded by hydrostatic pressure; and
    a clamping band for winding the fuel cell stack and the upper and lower end plates to be clamped at a predetermined clamping pressure,
    a hydrostatic pressure flow pipe extending from and penetrating an upper housing; and
    a hydraulic or pneumatic pressure supply apparatus connected to the hydrostatic pressure flow pipe, wherein the hydraulic or pneumatic pressure supply apparatus comprises a hydraulic brake system including a master cylinder that generates hydraulic pressure via operation of a brake pedal and a piston that receives the hydraulic pressure of the master cylinder to clamp a disc, or receives hydraulic or pneumatic pressure from a power steering system to generate hydraulic or pneumatic pressure,
    wherein the surface pressure of the fuel cell stack is controlled by applying hydraulic or pneumatic pressure to the upper end plate to be expanded.

2. The device of claim 1, wherein the upper end plate comprises:
    the upper housing having an opened bottom; a lower housing having an opened top; and
    an inflator disposed on a bottom surface of the lower housing and expanded by hydraulic or pneumatic pressure,
    wherein the upper housing is moved in a direction in which the fuel cells are stacked by the expansion of the inflator.

3. The device of claim 2, further comprising a hydrostatic pressure flow pipe extending from the inflator, penetrating the upper housing, and connected to a hydraulic or pneumatic pressure supply means.

4. The device of claim 2, wherein the upper housing comprises a female projection having a guide groove and integrally formed on a lower surface thereof, and the lower housing comprises a male projection inserted into the guide groove of the female projection and integrally formed on a lower surface thereof.

5. The device of claim 1, wherein the upper end plate comprises an the upper housing having an opened bottom; a lower housing having an opened top; and
    a sealing for air tightness formed along an outer circumference of the lower housing and brought into close contact with an inner circumference of the upper housing,
    wherein the upper housing is expanded to the outside by applying hydraulic or pneumatic pressure to an airtight space between the upper and lower housings.

6. The device of claim 5, wherein the upper housing comprises a female projection having a guide groove and integrally formed on a lower surface thereof, the lower housing comprises a male projection inserted into the guide groove of the female projection and integrally formed on a lower surface thereof, and the sealing for air tightness is inserted into a groove formed along an outer circumference of the lower housing.

7. The device of claim 1, further comprising a clip for maintaining displacement formed on an outer surface of the upper housing and a plurality of latch grooves, into which the clip is inserted, formed on a clamping band or on an inner surface or a peripheral of a stack enclosure.

* * * * *